Jan. 11, 1927.  
C. W. MANN  
TRANSMISSION BAND  
Filed July 18, 1923  
1,613,713  
2 Sheets-Sheet 1
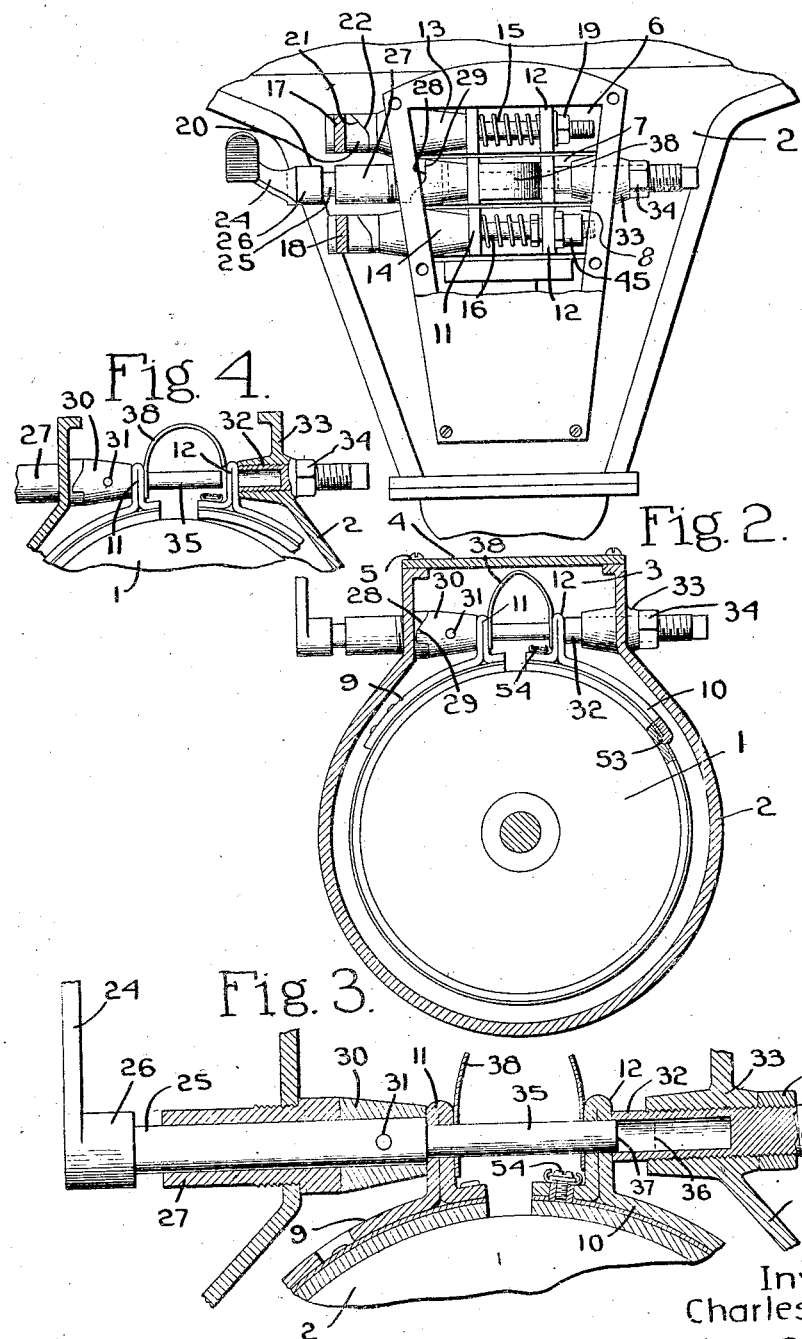
Inventor.  
Charles W. Mann  
by Heard Smith & Tennant  
Attys.

Jan. 11, 1927. 1,613,713
C. W. MANN
TRANSMISSION BAND
Filed July 18, 1923 2 Sheets-Sheet 2
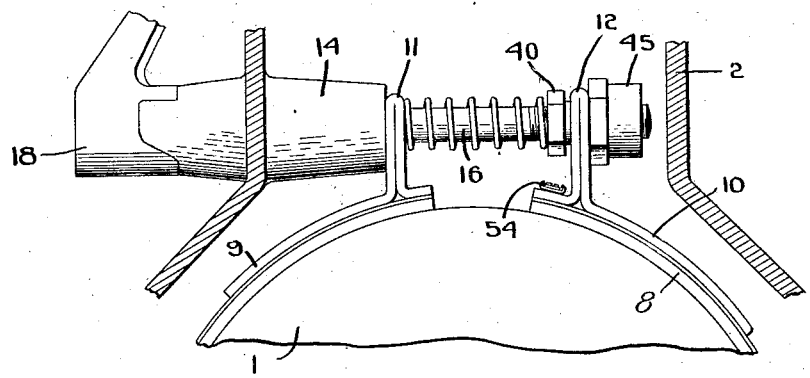
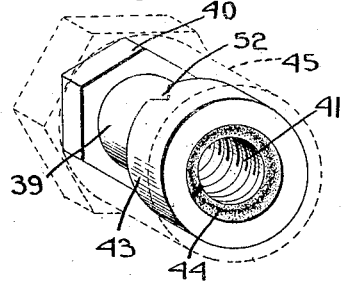
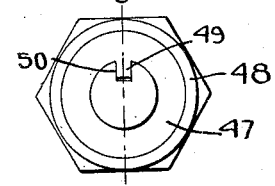
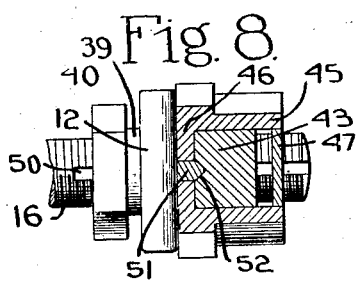
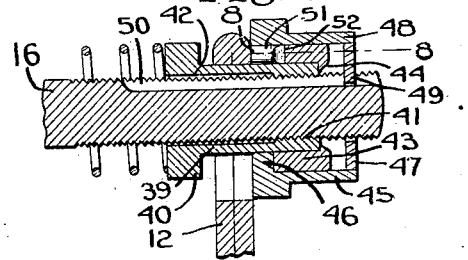
Inventor.
Charles W. Mann
by Heard Smith & Tennant.
Attys.

Patented Jan. 11, 1927.

1,613,713

UNITED STATES PATENT OFFICE.

CHARLES W. MANN, OF METHUEN, MASSACHUSETTS.

TRANSMISSION BAND.

Application filed July 18, 1923. Serial No. 652,209.

This invention relates to transmission bands and actuators therefor for planetary transmissions which are in closely confined spaces such as those bands used in one well-known make of automobile having a planetary transmission. The general object of the invention is to provide an arrangement of parts such that the transmission bands may be easily removed from their positions on the drums without unassembling the parts or removing the casing which surrounds the transmission.

A further object of the present invention is to provide a new actuator for the reverse and brake transmission bands of a Ford car.

A further object of the present invention is to provide new parts in place of some of the old parts and alter the old parts which remain so that all of the bands are rendered easily removed.

Other objects and features of the invention will more fully appear from the following description and the accompanying drawings and will be particularly pointed out in the claims.

In order to give an understanding of the invention I have illustrated in the drawings a selected embodiment thereof which will now be described.

In the drawings:

Fig. 1 is a plan view of a portion of a planetary transmission with the invention applied and the surrounding casing, part of the casing being broken away to expose the transmission;

Fig. 2 is a vertical section through Fig. 1, showing the actuator for the low speed transmission band in elevation;

Fig. 3 is an enlarged sectional view of the low speed brake band and actuating mechanism therefor;

Fig. 4 is a view showing the positions of the low speed transmission band and actuator therefor during the process of removing the band;

Fig. 5 is a fragmentary sectional view showing the brake band;

Fig. 6 is a perspective view of the adjusting nut and sleeve for the brake band;
Fig. 7 is a sectional view through the adjusting nut on the rock shaft 16, the view through the nut being taken on the line 9—9, Fig. 9;

Fig. 8 is a section on the line 8—8, Fig. 7;
Fig. 9 is an end view of the actuator for the transmission band.

As illustrated herein the invention is applied to a planetary transmission inclosed in a casing 2 having a hand hole 3 and a cover 4 for the hand hole secured to the casing by means of screws 5 all as is usual in the planetary transmission used on machines and particularly on a Ford car. The transmission is controlled by means of transmission bands 6, 7, and 8 which on the Ford car are three in number and placed one behind the other around the transmission drums 1. Each band has straining ears 9 and 10 at opposite ends presenting apertured upstanding portions 11 and 12.

In the bands 6 and 8, which are the reverse and brake bands respectively on a Ford car, the upstanding portions 11 bear against fixed abutments 13 and 14. Rock shafts 15 and 16 fastened to pedals 17 and 18 pass through the fixed abutments and through the apertures in the upstanding portions 11 and 12. The reverse and brake bands are usually each provided with an adjusting nut 19 shown in Fig. 1 threaded on the outer end of the corresponding rock shaft to bear against the upstanding portion 12. The end of each of the pedals 17 and 18 is enlarged at 20 and bevelled at 21 to engage with a corresponding bevelled portion or cam projection 22 fastened to the casing. It will be seen that when the pedal is pushed forwardly the bevelled portion 21 rides along the corresponding bevelled portion 22 to draw the rock shaft to the left and when the rock shaft is drawn to the left the ear 12 and the end of the transmission band to which it is fastened is drawn to the left to tighten the band around the transmission drum. A coiled spring 23 encircles each of the rock shafts 15 and 16 and normally keeps the ears 9 and 10 separated and the band loose about the drum. It will be readily seen that by adjusting the nut 19 along the rock shaft the straining ear on the end of the transmission band may be adjusted to regulate the relative position of the ears toward and from each other.

In the case of the low speed transmission band 7 which is shown in the center of Fig. 1 the pedal 24 is fastened to the rock shaft 25 at 26 with a connection which is entirely free from contact with any other part of the structure. The rock shaft passes through a sleeve 27 which is fixed in the casing 2 and has a cam surface 28 which co-operates with a cam surface 29 on a collar 30 which is fastened to the rock shaft by means of a pin 31. This collar has a square end which abuts the upstanding portion 11 so that when the pedal 24 is pushed forwardly the cam surfaces 28 and 29 ride past one another and push the upstanding portion 11 with its associated straining ear and the end of the brake band to which the straining ear is fast toward the straining ear 10. In order to adjust the relative positions of the ears toward or away from each other a hollow adjustable stationary abutment 32 is threaded through a sleeve 33 in the casing 2 and bears against the upstanding portion 12 of the straining ear 10. A lock nut 34 may be threaded on that portion of the abutment 32 which extends on the outside of the casing in order to hold the abutment in adjusted position. The rock shaft 25 is extended at 35 so that it passes through both upstanding portions 11 and 12 and in the usual construction goes into the hollow abutment as far as the dotted line 36 shown in Fig. 3. The above construction and arrangement of parts is usual in the Ford car.

My invention comprises a modification of the construction of some of the usual parts which are above described in order that either transmission band may be readily removed from and replaced around its transmission drum through the hand hole 3.

Each transmission band will preferably be provided with a removable straining ear such as described in my Patent No. 1,523,551, dated January 20th, 1925.

In the case of the actuating mechanism for the low speed transmission band the end of the rock shaft 35 has been cut off to a point 37 until it just lies within the end of the hollow abutment 32 and a leaf spring 38 has been used instead of the usual coiled spring to hold normally the upstanding portions 11 and 12 of the ears separated in the usual construction of the operating mechanism for the low speed transmission band when the band is worn out and it is desired to remove the old one and put in a new one the collar 30 had to be loosened from the rock shaft and then the whole shaft moved toward the left of Fig. 3 in order to permit the ears and coiled spring to be removed from the rock shaft. In the new construction, however, the end 37 of the rock shaft in its normal position is spaced from the fixed holder or sleeve 33 sufficiently to permit the upstanding portion of the ear to pass between the end of the shaft and the fixed holder when the abutment is retracted to the position shown in Fig. 4. It may be desirable to space the end of the rock shaft from the fixed holder a distance equal at least to the combined thickness of the spring 38 and the upstanding portion 12 to permit the upstanding portion and spring to pass between the end of the shaft and the fixed holder. If the rock shaft be thus shortened and its end spaced from the fixed holder it is evident that the brake band can be readily removed by the following process. The hollow abutment as backed out into the position shown which leaves a space between the end of the rock shaft and the fixed holder. The upstanding portion 12 is then moved toward the right and slipped off of the end of the rock shaft and removed from its operative position, then one end of the spring 38 is removed, then the other end of the spring 38 is removed, and finally the upstanding portion 11 of the ear 9 on the brake band is slipped off of the rock shaft and the entire brake band taken from the casing. When it is desired to put on the new brake band it is slipped around the transmission and the upstanding portion 11 is slipped over the end of the rock shaft. The upstanding portion 12 on the straining ear 10 is then brought into position ready to be placed on the end of the rock shaft and first one end and then the other of the leaf spring 38, and then put on the rock shaft. By simply tightening up on the hollow abutment the upstanding portion 12 will be forced over the end of the rock shaft and the band is ready for use. The above described construction for facilitating the removal and replacement of the low-speed transmission band is not claimed herein.

A new construction for the actuating mechanism for the brake and reverse transmission bands has been made in order to facilitate the changing of these bands. In Fig. 1 of the drawings the usual construction for adjusting the reverse and brake transmission bands has been shown applied only to the reverse band, and the new construction has been shown applied to the brake band. In the case of the rock shaft for the brake and reverse transmission bands there is nothing to correspond with the collar 30 on the low speed band and consequently the rock shaft if it is loosened from the straining ear 10 may be easily withdrawn from within the casing. The difficulty, however, has been that in the case of the brake band, and to some extent in the case of the reverse transmission band, the end of the rock shaft extends so far under the side of the casing at the hand hole that it is only with difficulty that the nut 19 could be threaded on the rock shaft. In order to obviate this difficulty a structure has been designed which includes a device to take the place of the nut 19 and has permanently connected therewith a removable straining ear 10.

In the new construction the wrench receiving portion of the nut which adjusts the relative positions of the ears has been conveniently located between the ears where it can be easily reached at all times to adjust the ears toward and away from each other.

The improved actuator comprises a nut having a sleeve extension 39 encircling the shaft with a shoulder or wrench receiving portion 40 on the inner end by which the threaded part of the sleeve forming the nut may be rotated. The nut has threads 41 to engage with the threads on the rock shaft, and the sleeve is slightly enlarged at 42 so that it may be easily slipped over the end of the rock shaft in order that when the nut is to be put on the rock shaft the sleeve portion will hold the nut in proper position for the threads on the nut to catch with the threads on the rock shaft. A second shoulder 43 is fast to the sleeve on the outer end thereof and is spaced from the upstanding portion 12 of the straining ear 10. This second shoulder is made separately from the sleeve and is welded at 44 to the sleeve during the assembling of the actuator. A barrel 45 is mounted on the sleeve with a shoulder 46 closely embracing the sleeve between said second shoulder on the sleeve and the outer side of the upstanding portion 12. It will thus be seen that when the sleeve is rotated by means of a wrench applied to the wrench receiving portion 40 the nut and sleeve move toward the left and the shoulder 43 bears against the shoulder 46 on the barrel and presses it against the outer side of the upstanding portion 12 to adjust the ear along the shaft.

In order to prevent the nut from rotating during the normal operation of the actuator and backing off the end of the shaft a washer 47 has been firmly fixed in the end 48 of the barrel and has a tab 49 extending into a slot 50 cut in the rock shaft to prevent the barrel from turning. In order to lock the sleeve to the barrel relatively yielding interlocking portions have been formed on the barrel and on the sleeve. A convenient way of yieldingly locking the barrel to the sleeve is to form a projection 51 on the shoulder 46 of the barrel to engage with a recess 52 cut in the shoulder 43 on the sleeve. The pressure of the upstanding portion 12 against the shoulder 46 of the barrel holds the interlocking portions 51 and 52 in yielding engagement with one another. It is obvious from the description that the ear is permanently connected with the sleeve and the combined device is put on the end of the rock shaft as a unit.

In assembling the unit the sleeve 39 is made without the shoulder 43 and the upstanding portion 12 of the ear 10 is put over the sleeve. The barrel 45 is then put on the sleeve and the shoulder 43 is put over the end of the sleeve within the barrel and welded to the sleeve. The washer 47 is then fixed in the end 48 of the barrel.

When a transmission band of this type is to be installed on the drum the band with the single straining ear 9 attached is placed around the transmission drum and the upstanding portion 11 of the attached straining ear is placed on the rock shaft in the usual manner. The free end of the band which is to have the improved device attached thereto is brought around into position and the removable straining ear 10 with the associated sleeve is then secured to the band by means of the catch 53 and screw 54. The sleeve is then placed over the threaded end of the rock shaft and rotated by means of a wrench applied to the wrench receiving portion 40 to draw the straining ear and the end of the band along the rock shaft into the proper operating position.

From the above description it will be seen that I have provided an extremely simple actuator for transmission bands which permits the bands to be applied to planetary transmissions without removing the casing surrounding the transmission. Although a preferred form of the device has been described it is obvious that modifications may be made and it is therefore desired that the above description and accompanying drawings be used as illustrative only and that the invention be construed as broadly as the limitations in the claims, taken in conjunction with the prior art, may allow.

Having thus described the invention, what is claimed as new and desired to be secured by Letters Patent, is:

1. The combination of a transmission band having a straining ear at each end with an actuator for the band comprising a rock shaft, and means adjustable along the shaft to regulate the relative positions of the ears toward and away from each other provided with a wrench receiving portion located between the ears by which said means may be adjusted.

2. The combination of a transmission band having a straining ear at each end and presenting apertured upstanding portions, with an actuator for the band comprising a rock shaft extending through the apertures, means engaging one upstanding portion adjustable along the shaft to regulate the relative positions of the ears toward and away from each other, an actuator for said means situated between the ears and a lock to retain the adjusting means in adjusted position.

3. The combination of a transmission band having a straining ear at each end presenting apertured upstanding portions, with an actuator for the band comprising a rock shaft extending through the apertures, a nut threaded on the shaft having a sleeve extending therefrom through one aperture, a wrench receiving portion on the sleeve situated between the ears by which the nut and sleeve may be rotated for adjustment along the shaft, and means mounted on the sleeve outside of the ear bearing against the upstanding portion thereof and movable with the sleeve along the shaft but locked to the shaft against rotative movement independent of the shaft whereby when the sleeve and nut are rotated said means presses against the upstanding portion of the associated ear thereby to adjust the ears toward or away from each other.

4. The combination of a transmission band having a straining ear at each end presenting apertured upstanding portions, with an actuator for the band comprising a rock shaft extending through the apertures, a nut threaded on the shaft having a sleeve extending therefrom through one aperture and having a wrench receiving portion on the sleeve situated between the ears by which the nut and sleeve may be rotated for adjustment along the shaft, a barrel mounted on the sleeve outside of the ear bearing against the upstanding portion thereof and movable with the sleeve along the shaft but locked to the shaft, rotative movement independent of the shaft and relatively yielding interlocking portions on the barrel and on the sleeve whereby when the nut and sleeve are rotated said barrel presses against the upstanding portion of the associated ear thereby to adjust the ears toward or away from each other and the sleeve is locked against rotation during the normal operation of the actuator.

5. The combination of a transmission band having a straining ear at each end presenting apertured upstanding portions, with an actuator for the band comprising a rock shaft extending through the apertures, a nut threaded on the shaft and having a sleeve extending therefrom with a shoulder on the inner end of the sleeve by which the nut may be rotated and a second shoulder on the other end spaced from the upstanding portion, a barrel loosely mounted on the sleeve with a shoulder closely embracing the sleeve between said second shoulder on the sleeve and the outer side of the upstanding portion, and means fastening the barrel to the shaft to prevent rotation of the barrel except with the shaft but to permit longitudinal movement of the barrel along the shaft whereby when the nut is rotated the ears are adjusted toward or away from each other.

In testimony whereof, I have signed my name to this specification.

CHARLES W. MANN.